United States Patent
Behrendt et al.

(10) Patent No.: US 7,747,709 B2
(45) Date of Patent: Jun. 29, 2010

(54) METHOD AND SYSTEM FOR AUTOMATICALLY CLONING IT RESOURCE STRUCTURES

(75) Inventors: Michael M. Behrendt, Randersacker (DE); Jochen Breh, Stuttgart (DE); Gerd Breiter, Wildberg (DE); Thomas Spatzier, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 456 days.

(21) Appl. No.: 11/620,206

(22) Filed: Jan. 5, 2007

(65) Prior Publication Data

US 2007/0198667 A1    Aug. 23, 2007

(30) Foreign Application Priority Data

Jan. 27, 2006 (EP) ................... 06100942

(51) Int. Cl.
- G06F 15/16 (2006.01)
- G06F 15/173 (2006.01)
- G06F 15/177 (2006.01)

(52) U.S. Cl. .............. 709/220; 714/49; 726/4; 726/6; 713/175

(58) Field of Classification Search ......... 709/217–224; 726/1–8; 714/49

See application file for complete search history.

(56) References Cited

U.S. PATENT DOCUMENTS

| 2003/0084350 A1* | 5/2003 | Eibach et al. ............... 713/201 |
| 2007/0198667 A1* | 8/2007 | Behrendt et al. ........... 709/220 |
| 2007/0220370 A1* | 9/2007 | Branda et al. ............... 714/49 |

OTHER PUBLICATIONS

Patterns: SOA with an Enterprise service Bus in WebSphere Application Server V6, IBM, Redbooks, May 2005, pp. 1-410.*

(Continued)

*Primary Examiner*—Haresh N Patel
(74) *Attorney, Agent, or Firm*—Steven Chiu

(57) ABSTRACT

A method and system for automatically cloning IT resource structure in stateful web services environments by employing a new approach for configuration management. The present new approach models the configurational state of each resource as a stateful web service. Configuration data are provided by this service's resource properties. Relationships between configurations of different resources are modeled as "stateful web services relationships" between web service instances. These relationships can be navigated, which allows exploring the configuration of a whole system in a standards-based way. Additionally a new web service interface is provided by the stateful web service encapsulating the resource. This interface provides two new operations: "getConfiguration" allows an exploiter to take a snapshot of a resource's and related resources' configurational state and "setConfiguration" allows for setting the configurational state of a resource to a previously saved state. An invocation of "getConfiguration" results in the creation of a new stateful web service instance that stores the configurational state of each resource. This new web service interface is implemented on a per-resource type basis. Any back-end technology may be used to implement this new web service interface.

11 Claims, 7 Drawing Sheets

OTHER PUBLICATIONS

Karl Czajkowski et al "The WS-Resource Framework", IEEE May 3, PCT International Search Report dated Dec. 21, 2006 pp. 1-13.

Giuliana Teixeira Santos et al "FTWeb: A Fault Tolerant Infrastructure for Web Services", Proceedings of the 2005 Ninth IEEE International EDOC Enterprise Computing Conference, pp. 1-11 Dec. 31. 2004, pp. 1-18.

Jyotishman Patak et al. "A Framework for Dynamic Resource Management on the Grid", HP Laboratories, Aug. 22, 2995, pp. 1-11.

Tim Banks OASIS Web Services Resource Framework (WSRF) - Primer, Dec. 2005, pp. 1-42.

Steve Graham et al OASIS Web Services Resource 1.2 (WS-Resource) Committee Specification, Jan. 9, 2006, pp. 1-16.

Steve Graham et al OASIS Web Services Resource Properties 1.2 (WS-ResourceProperties), Committee Specification, Jan. 20, 2006, pp. 1-64.

Latha Srinivasan et al OASIS Web Services Resource Lifetime 1.2 (WS-ResourceLifetime), Committee Specification, Jan. 9, 2006, pp. 1-30.

Tom Maguire OASIS Web Services Service Group 1.2 (WS-ServiceGroup) Committee Specification, Jan. 9, 2006, pp. 1-41.

Lily Liu et al. OASIS Web Services Base Faults 1.2 (WS-BaseFaults), Committee Specification, Jan. 9, 2009, pp. 1-20.

William Vambenepe OASIS Web Services Distributed Management : Management Using Web Services (MUWS 1.0), Part 2, OASIS Standard, Mar. 9, 2005, pp. 1-53.

William Vambenepe OASIS Web Services Distributed Management: Management Using Web Services (MUWS 1.0), Part 1, OASIS Standard, Mar. 9, 2005, pp. 1-30.

Igor Sedukhin OASIS Web Services Distributed Management: Management of Web Services (WSDW-MOWS) 1.0, OASIS Standard, Mar. 9, 2005, pp. 1-50.

* cited by examiner

METHOD AND SYSTEM FOR AUTOMATICALLY CLONING IT RESOURCE STRUCTURES

TECHNICAL FIELD OF THE INVENTION

The present invention relates to the field of service oriented IT resource structures in which resources are modeled as stateful web services, and in particularly it relates to a method, system and computer program product for automatically cloning existing IT resource environments while maintaining its resource topology.

BACKGROUND ART

Today's IT resource structures are composed of a large number of heterogeneous, distributed resources. The key to building on demand IT structures is to provide means for managing these resources through a common, standards-based interface and to provide standards-based interoperability between resources.

The Web Services Resource Framework (WS-RF) introduces a technology to encapsulate each kind of resource behind web services interfaces. In particular, WS-RF concentrates on the stateful characteristics of IT resources. For example, the state of an operating system resource might include the current number of processes running in the system, or the number of logged in users.

In accordance to the WS-RF, all stateful resources within an IT environment are managed via web services interfaces, i.e. clients invoke web service calls on a web service endpoint, which are then mapped to particular stateful resources (see FIG. 1). Within the WS-RF set of specifications, several standard web service interfaces in the form of web service portTypes are defined that can be provided by said web service front-ends of stateful resources. These standard portTypes are concerned, for example, with resource lifetime management, resource state queries, or notification support.

The state of resources in terms of the WS-RF is stored in so-called resource properties. The sum of all resource properties for a specific resource is contained in the ResourcePropertyDocument—an XML document that can be retrieved via standard web service calls defined by the WS-RF.

All resources in the IT resource structure are modelled as WS-Resources according to the WS-Resource framework, i.e. resources are encapsulated behind stateful web services interfaces. Resources can include physical IT resources such as computers or storage, logical software resources such as operating systems or web servers, or logical business related resources such as customers, offers, or whole on demand service environments.

Resources in such an on demand environment are related to each other. These relationships are modeled as stateful web services relationships, which store references to all stateful web services taking part in the relationship. Relationships can be navigated. Hence, an on demand environment can be seen as a graph. The most common form of an environment is a tree topology which originates at a logical on demand service (ODS) resources. Via relationships the tree can be traversed down to the leaves, which will most commonly be physical resources. In general, an on demand environment can have any topology including bi-directional relationships and cyclic relationships. Such a graph can also be navigated using the appropriate graph algorithms.

Initial Problem

Today's IT environments are composed of dozens or hundreds of heterogeneous resources. In order to clone a complex IT environment it is necessary to acquire the configurational state of the overall system (i.e. system topology, number and type of used resources, configuration state of individual resources, relationships between resources, etc.), and then use the obtained data to instantiate an equal IT system with a likewise layout.

While it is possible to manage the configurational state of individual resources via resource type or vendor specific interfaces, it is not possible to manage the configuration of the overall system via common, standards-based interfaces.

IT environments can consist of numerous different types of resources that are hosted by different back-ends. Even though techniques such as WS-RF provide means for communicating with these back-ends in a standardized way, the problem of configuration management is not covered by WS-RF or other stateful web service specifications. As a result, exploiters of resources have to manually deal with configuration management on a per-resource basis. Furthermore, no standard means for relationship management between the configurations of individual resources are provided. Such relationships between configurations, however, would be required in order to provide a system-wide configurational view.

Prior Art

In state-of-the art IT resource structure it is possible to store configuration data in databases in a per-resource fashion. The stored data can later be used to bring a resource back into a defined state. The state of software objects, or the configuration of a software object respectively, can also be made persistent in object-relational databases.

WS-RF introduces the notion of resource properties to reflect the state of resources. The combination of all resource properties of a particular resource is contained in the so-called ResourcePropertyDocument. This XML document can be retrieved using web service calls and can be stored in an XML database.

Even though it is possible to store configuration data for individual resources, and to restore a resource's configuration in traditional IT infrastructures, no common means exists to perform configuration management across all resources in a service-oriented stateful web services environment. Each type of resource provides a proprietary, type-specific configuration management interface.

The concept of the ResourcePropertyDocument for WS-RF compliant stateful resources does not suffice the needs for configuration management. Firstly, the data contained in such a ResourcePropertyDocument might not be related to a resource's configuration (e.g. a CPU core temperature property of a computer resource is not related to its configuration, but is rather influenced by the current load or environment temperature). Secondly, data that reflects a resource's configuration might not be exposed via the ResourcePropertyDocument.

In addition, no mechanisms exist to correlate configuration data of individual resources to form a system-wide configuration record. All the aspects just mentioned needed to be resolved in order to allow for the cloning of an IT system in an automated fashion.

Objects of the Invention

The present invention provides a method, system and computer program product for automatically cloning existing IT resource structures in a service-oriented, stateful web services environment avoiding the disadvantages of the prior art.

SUMMARY OF THE INVENTION

The present invention provides a method, system and computer program product for automatically cloning IT resource structures in stateful web services environments by employing a new approach for configuration management.

The new approach models the configurational state of each resource as a stateful web service. Configuration data will be provided by this service's resource properties. Relationships between configurations of different resources are modeled as "stateful web services relationships" between web service instances. These relationships can be navigated, which allows to explore the configuration of a whole system in a standards-based way.

Additionally a new web service interface is provided by the stateful web service encapsulating the resource.

This interface provides two new operations: "getConfiguration" allows an exploiter to take a snapshot of a resource's and related resources' configurational state and "setConfiguration" allows for setting the configurational state of a resource to a previously saved state. An invocation of "getConfiguration" results in the creation of a new stateful web service instance that stores the configurational state of each resource.

This new web service interface is implemented on a per-resource type basis. Any back-end technology may be used to implement this new web service interface.

The above, as well as additional objectives, features and advantages of the present invention will be apparent in the following detailed written description.

The novel features of the invention are set forth in the appended claims. Embodiments of the invention, however, as well as a preferred modes of use, further objectives, and advantages thereof, will be best understood by reference to the following detailed description of an illustrative embodiment when read in conjunction with the accompanying drawings.

DETAILED DESCRIPTION

Figure 1A:
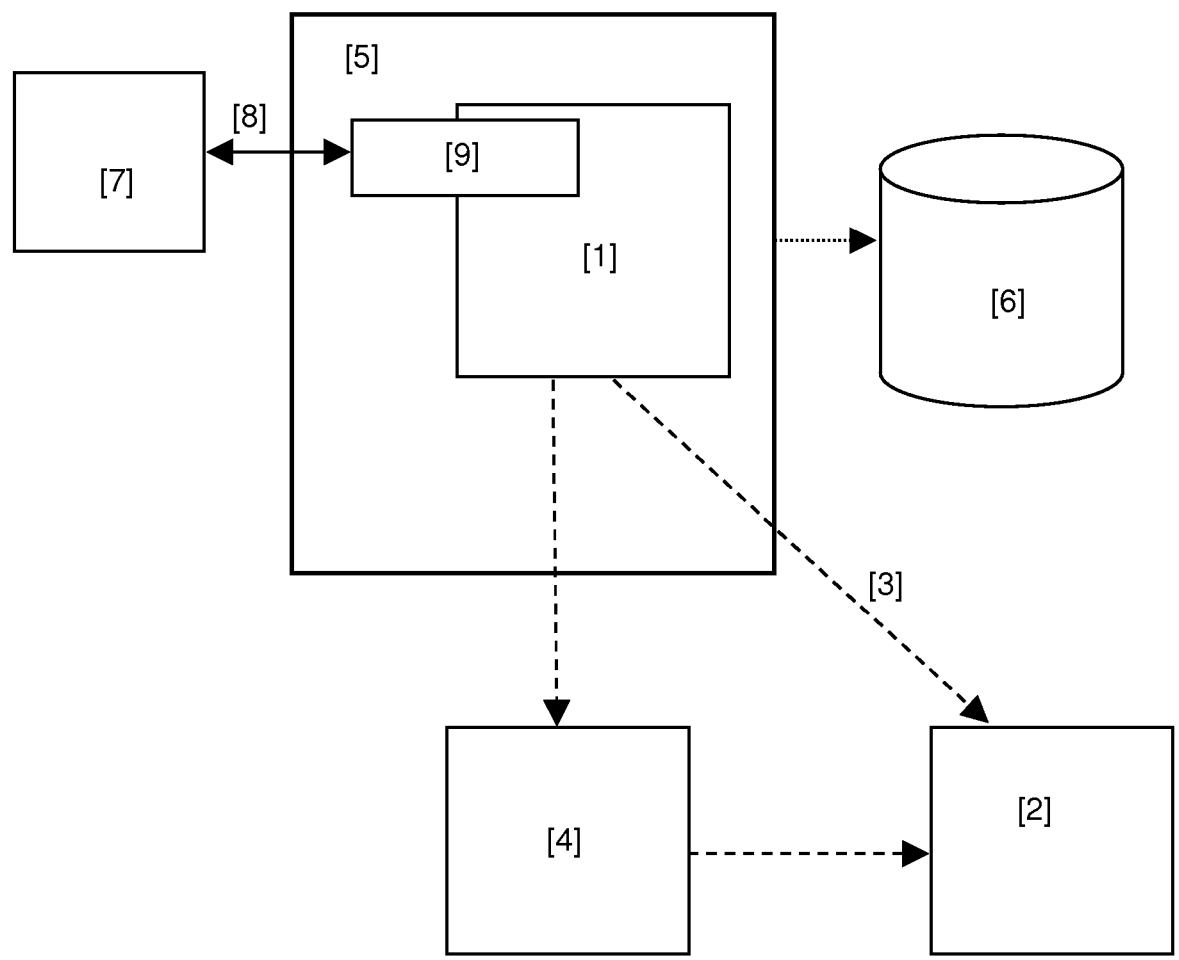
FIG. 1A shows a resource as a stateful web service.
Figure 1B:
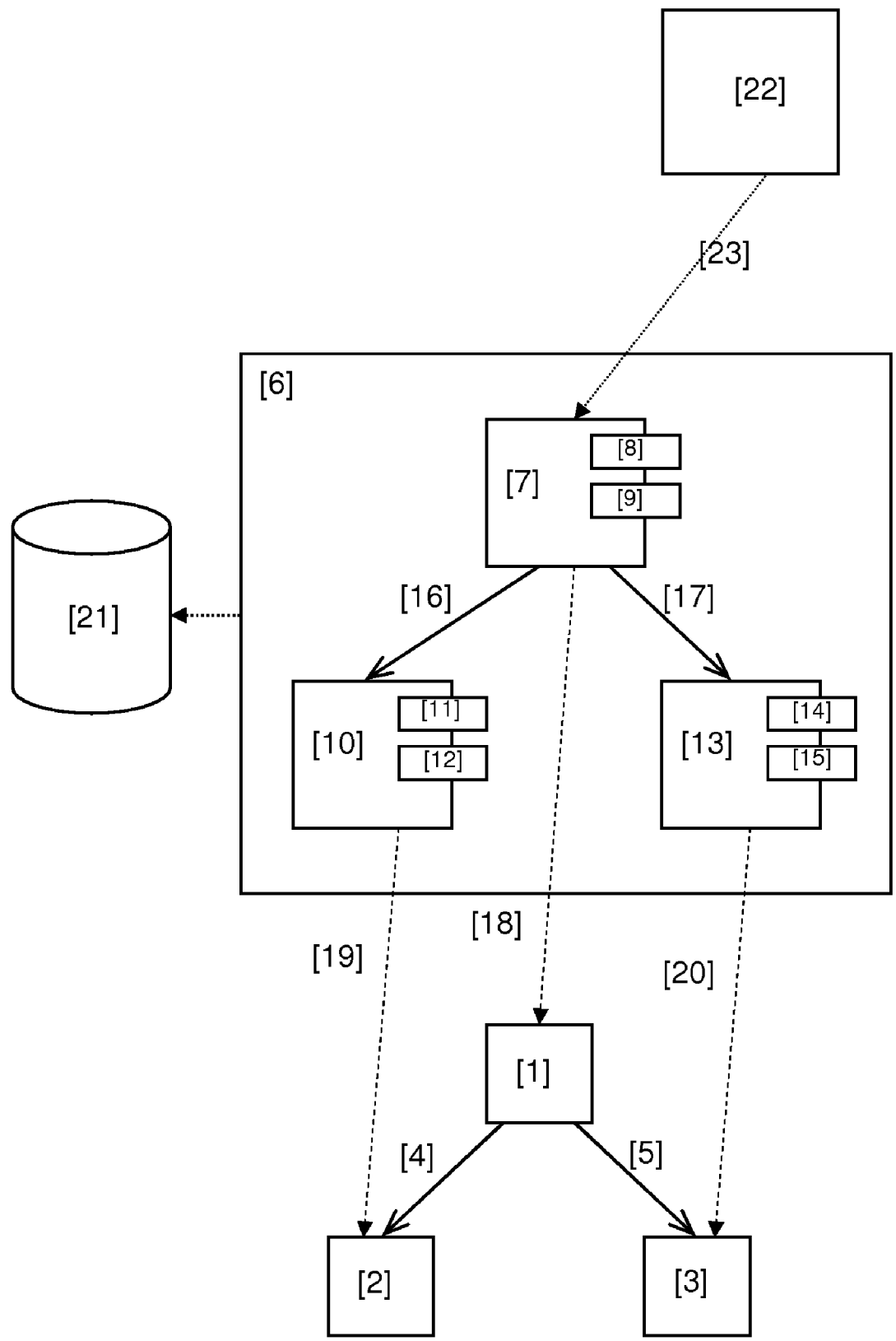
FIG. 1B shows an example of an IT resource structure to be cloned according to an embodiment of the present invention.

The present invention relates to the field of Service Oriented Architectures (SOA) where IT resources are modeled as stateful web services, i.e. they are encapsulated behind stateful web services interfaces.

A common pattern for modelling resources as stateful web services is shown in FIG. 1. A stateful web service [1] exists as a client front-end for a physical or logical IT resource [2]. This stateful service [1] is hosted by a web services container [5] such as Websphere Application Server. The stateful service communicates with the underlying resource either directly over a resource type specific communication protocol [3] (e.g. SNMP), or it connects to the resource by means of an instrumentation server [4] in a case where the resource does not support direct instrumentation.

The stateful web service [1] is stateful in that it reflects the current state of the underlying resource, i.e. clients can query and/or change the state of the resource at any time. In order to access the state of the underlying resource [2] the stateful service [1] communicates with the resource via [3] or [4]. In addition, state data can also be stored in a database [6] attached to the application server [5]. The stateful service [1] can access this database, for example, using Enterprise Java Beans (EJBs).

Clients can access the stateful web service using standard web services protocols [8] such as SOAP over HTTP. Each stateful web service offers a number of resource type specific web services interfaces (portTypes) [9] that offer a set of operations which can be invoked by clients. For example, a stateful web service that encapsulates a server resource could provide an interface with the two operations "startServer" and "stopServer". Furthermore, each stateful web service typically offers interfaces to query the resource state, i.e. to retrieve so-called resource properties.

The modelling pattern just described is a generic architectural pattern. Possible implementation standards exist in the form of the Web Service Resource Framework (WS-RF) set of specifications or the Web Services Distributed Management (WSDM) set of specifications which build on top of WS-RF.

EndpointReferences for Addressing Stateful Services

In contrast to standard (stateless) web services, which are addressed by a simple URL, stateful web services require a more sophisticated addressing mechanism that allows clients to access specific instances of stateful web services.

This addressing mechanism makes use of EndpointReferences and is specified in the WS-Addressing standard. Such an EndpointReferences can be compared to an object reference or pointer as used in object oriented programming languages. It is an entity that contains information about the location of a web service endpoint (in the form of a URL), as well as additional information that allows the stateful web service implementation to map a web service call to a specific resource.

A client that poses an EndpointReference is able to communicate with a specific instance of a stateful service, or with a specific resource respectively.

The following resource structure that is also depicted in FIG. 1 B will serve as an example for explaining the details of an embodiment of the present invention. An operation system resource [1] hosts an application server application [2] and a database application [3]. The arrows [4, 5] in FIG. 1B express the "hosts" relationship that exists between [1] and [2, 3]; the relationships are read: "operating system [1] hosts application server [2]" and "operating system [1] hosts database [3]". The following resource properties that are relevant in the context of configuration are defined for the resources:

operating system [1]:
    patchLevel (e.g. Servicepack 1)
    userAccounts application server application [2]:
    securityPolicy (e.g. security enabled/disabled)
    maxConcurrentSessions (maximum number of concurrent client sessions)

database application [3]:
    cachingStrategy
    codeSet (e.g. Unicode UTF-8)

Each of the resources mentioned above are exposed to clients by means of stateful web services [7], [10] and [13]. These stateful services are hosted by application server [6] that serves as a web services container, and communicate with the underlying IT resources via the resource type and vendor specific links [18], [19] and [20]. In addition, state data of the stateful web services can be stored in the database [21] that is attached to application server [6]. The "hosts" relationships between resources [1] and [2], or between resources [1] and [3], respectively, are reflected by the stateful web services relationships [16] and [17]. By traversing these stateful web services relationships it is possible to find all stateful services that are "hosted" by stateful service [7] (or by the IT resource represented by [7], respectively).

Each of the stateful services provides a resource type specific interface ([9], [12] and [15]). For the operation system service [7] interface [9] could comprise e.g. the operations "startApplicationProcess" or "stopApplicationProcess". Interface [12] of the application server service [10] could provide, for example, "deployApplication" and "undeployApplication". Interface [15] of the database service [13] might provide the operations "createTable" and "deleteTable".

In addition to the resource type specific interfaces, each stateful web service also provides the "ConfigurationManagement" interface ([8], [11] and [14]) proposed by an embodiment of the current invention. This interface offers the two operations "getConfiguration" and "setConfiguration".

A client [22] that is in possession of a valid EndpointReference that points to the operating system service can invoke web service calls [23] on that stateful service. Furthermore, by traversing relationships [16] or [17] the client can obtain EndpointReferences of the application server service or the database service and can invoke stateful web service calls on these resources as well.

Taking a Configuration Snapshot of an IT Resource Structure

The process (as shown in FIG. 1 C) of obtaining the configuration of an IT resource structure (in the form of a graph that contains the configuration of resources as nodes and relationships between these configurations as edges) is controlled by a "ConfigurationManager" component [24]. This component allows a client to initiate the creation of a configuration snapshot of a given resource structure, as well as to create a resource structure based on previously taken configuration snapshots.

Client [22] has an EndpointReference pointing to the operating system service/resource [7] (Note: the notation "service/resource" means that clients communicate with the service front-end but logically actually operate on the resource that is encapsulated by that service). It issues a request to take a configuration snapshot of the resource structure that has [7] as anchor node. This request [25] has the EndpointReference to stateful service [7] as a parameter.

The ConfigurationManager [24] can now access the ConfigurationManagement interface [8] of service [7] using the provided EndpointReference. It invokes the getConfiguration operation on the operating system service by issuing a web service call [27]. In the course of this operation, a new "ResourceConfiguration" web service instance [31] is created [29], which stores all items that make up the configuration of the operating system service. This ResourceConfiguration stateful web service instance is hosted in a web services container (application server) [30]. Configuration data, i.e. properties of the ResourceConfiguration stateful web service instance, is stored in a database [43] attached to the application server. For example, this data can be accessed using technologies such as Enterprise Java Beans (EJBs). Note that application servers [30] and [6] might also be the same, i.e. both the stateful services representing the IT resources and the ResourceConfiguration stateful web service instances might be hosted by the same web services container.

The EndpointReference pointing to the new ResourceConfiguration stateful web service instance [31] is returned [28] to the ConfigurationManager. The ConfigurationManager [24] now traverses the resource structure by following stateful web services relationships. By following relationship [16] the ConfigurationManager finds stateful service/resource [10]. It invokes the getConfiguration operation of that service and gets the EndpointReference to a new ResourceConfiguration stateful web service instance [34], which stores all configuration data associated to the application server service/resource [10].

After receiving the EndpointReference to ResourceConfiguration stateful web service instance [34] the ConfigurationManager associates [42] the two ResourceConfiguration stateful web service instances [31] and [34] in stateful web services relationship [40]. This is to reflect the relationship that exists between resources in the resource structure in a relationship between their respective configurations. As a result, a graph of ResourceConfiguration stateful web service instances is created that has the same topology as the graph of resources.

The same steps are repeated for stateful service/resource [13], i.e. service [13] is found by following relationship [17], getConfiguration is invoked, ResourceConfiguration stateful web service instance [37] is created by service [13], the EndpointReference of [37] is returned to the ConfigurationManager, a relationship [41] between ResourceConfiguration stateful web service instances [31] and [37] is created.

At the end of the process of taking a configuration snapshot, a graph of ResourceConfiguration stateful web service instances exists, that represents the system configuration of the overall source resource structure. This graph is made up of the configurations of individual resources as nodes and relationships between these configurations as edges. The EndpointReference to the anchor or root ResourceConfiguration stateful web service instance is returned [26] to the client that requested the configuration snapshot.

ResourceConfiguration Stateful Web Service Instances

Configuration data that represents the configurational state of a resource is stored in ResourceConfiguration stateful web service instances. These ResourceConfiguration stateful web service instances are resource type specific, as they store configuration data that is specific for each different type of resource. ResourceConfiguration stateful web service instances are created by a stateful service (representing a resource) in the course of the getConfiguration operation. The implementation is resource type specific and has to be provided by the developer of the stateful service for a given type of resource. Typically, this developer has the expert knowledge to decide what information needs to be stored in a ResourceConfiguration stateful web service instance for his type of resource. The implementation of the setConfiguration operation which allows for applying the data stored in a ResourceConfiguration stateful web service instance to a resource instance also has to be provided by the respective developer, since he, again, has the required expert knowledge needed to apply the configuration data correctly.

As mentioned above, ResourceConfiguration stateful web service instances are resource type specific. However, this embodiment of the present invention proposes a minimal interface (set of operations and set of properties) to be provided by each ResourceConfiguration stateful web service instance. Each such service has at least the following two properties:

resourceType: identifies the type of resource to which the ResourceConfiguration is associated; this information is needed when creating a clone resource structure from a graph of ResourceConfiguration stateful web service instances. Configuration data stored in a ResourceConfiguration stateful web service instance can only be applied to resources of the stated type.

timestamp: identifies the date and time when the ResourceConfiguration stateful web service instance has been created, i.e. the configuration snapshot has been taken. This is to distinguish several ResourceConfigurations for the same stateful resource instance.

Furthermore, the default interface has to provide means for retrieving said properties of a ResourceConfiguration stateful web service instance.

Figure 1C:
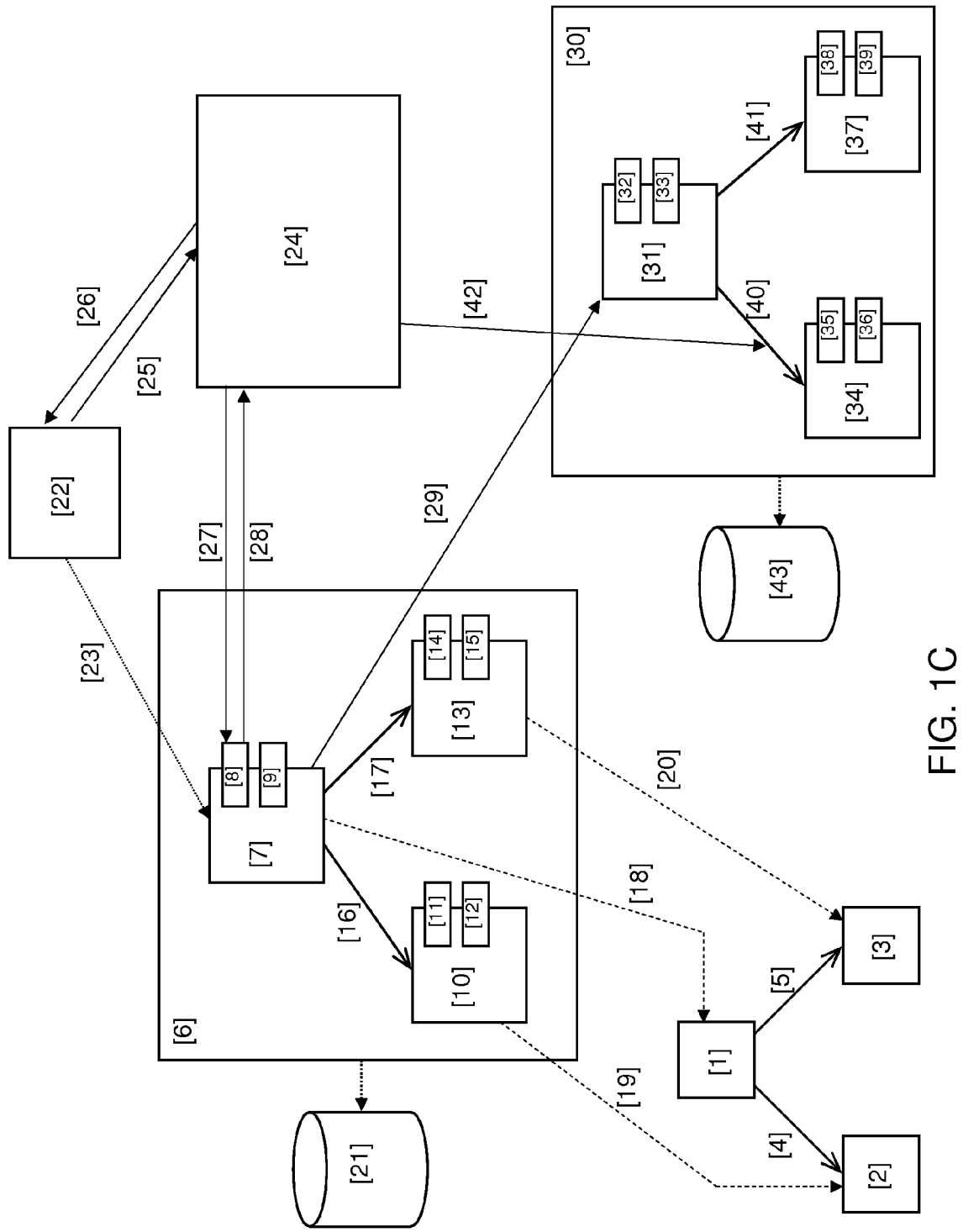
FIG. 1C shows the inventive method for taking a configuration snapshot of the IT resource structure as shown in FIG. 1B.
Figure 1D:
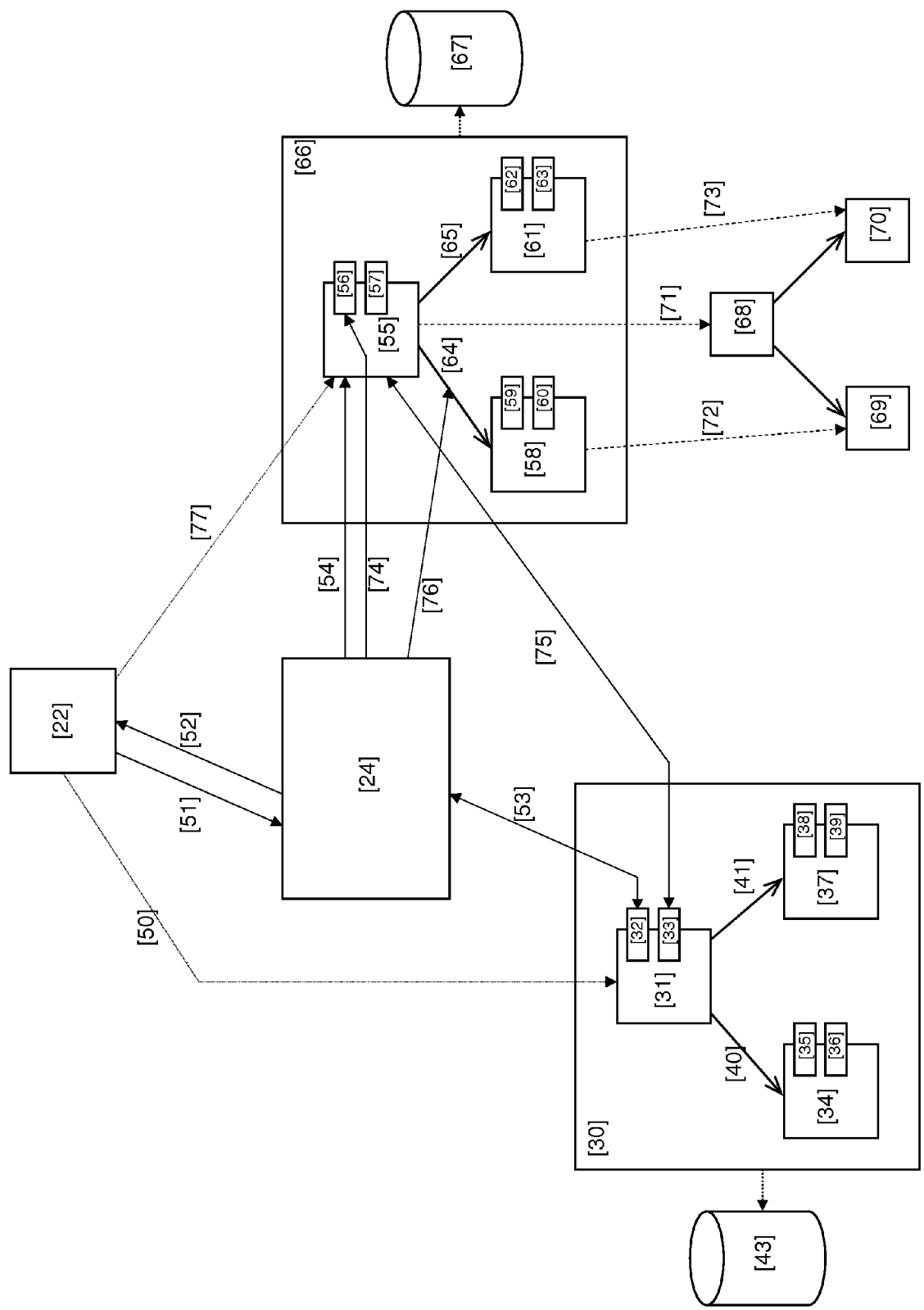
FIG. 1D shows the inventive method for building a clone IT resource structure from a previously obtained configuration snapshot as shown in FIG. 1C.

For the ResourceConfiguration stateful web service instances shown in FIG. 1C this default interface is depicted as [32], [35] and [38]. This interface is required by an embodiment of the present invention in order to take a configuration snapshot and creating a clone resource structure based on it.

In addition, each ResourceConfiguration stateful web service instance provides a resource type specific interface (set of operations and set of properties) ([33], [36] and [39] in FIG. 1C). The set of operations and properties provided by this interface is determined by the resource developer. For the ResourceConfiguration [31] associated to the operating system service/resource [7], for example, the type specific properties would include "patchLevel" and "userAccounts". Since the setConfiguration operation for a type of resource is also type specific and implemented by the resource developer, the implementation of the stateful service encapsulating a resource "knows" the type specific operations and properties of a ResourceConfiguration stateless web service instance so that it can work with this information and apply it to a resource instance.

For example, when invoking setConfiguration on an operating system stateful service, the service "knows" that the configuration data contains an item "patchLevel" and an item "userAccounts", and the service "knows" how to apply these two configuration items to a resource of type operating system (e.g. install all patches indicated by the patchLevel property and create all user accounts listed in the userAccounts property).

Building a Clone Resource Structure from a Previously Obtained Configuration Snapshot In the step explained in the previous section the configuration of a resource structure has been obtained. This configuration is stored in a graph, where the nodes are instances of ResourceConfiguration stateful web service instances that hold the configuration data of individual resources and the edges are relationships between these single configurations and reflect relationships between the resources in the original resource structure. Based on this configuration graph a new resource structure—which is called a clone of the original resource structure—can be created that has the same configuration and topology as the original resource structure. This process is shown in FIG. 1 D. The client [22] possesses [50] an EndpointReference to ResourceConfiguration stateful web service instance [31], which is the anchor or root node of the graph of ResourceConfiguration stateful web service instances that, at the whole, represents the configuration of the original resource structure. All ResourceConfiguration stateful web service instances are hosted within a web services container [30], i.e. an application server. Configuration data is stored in a database [43] attached to the application server and can be accessed, for example, using EJBs.

The client issues a request [51] on the ConfigurationManager [24] to create a resource structure according to the information contained in the configuration graph originating at ResourceConfiguration stateful web service instance [31]. Parameters of the request include the EndpointReference of service [31] as well as the location of the hosting infrastructure (e.g. a data center with physical and logical IT resources, resource registries, resource pools, resource factories, etc.) where the resource structure shall be created.

The ConfigurationManager can now query [53] ResourceConfiguration stateful web service instances [31] in order to get to know the type of resource (in our example "operating system") to which this configuration applies. This query is issued on the default ResourceConfiguration interface [32] that is implemented by each ResourceConfiguration stateful web service instance. Having obtained the type of resource, the ConfigurationManager can now get hold of an instance of the required resource in the hosting infrastructure (for example create a new resource, or get a resource from a free pool). This is indicated by arrow [54] that symbolizes the creation of stateful service/resource [55].

The layout of the hosting infrastructure and the way in which resources are managed by that infrastructure are beyond the scope of this document. Typically, such an infrastructure would comprise a number of registries to find resources, factories to create new resource instances and pools of available resources. Furthermore, the infrastructure includes a web services hosting environment [66] (application server) that serves as a container for the stateful web service front-end interfaces to IT resources.

The stateful service [55] of type operating system service is hosted by an application server [66] and is addressable via an EndpointReference. A communication link [71] to the "real" IT resource [68] exists for invoking actions on the resource or for querying state data. In addition, state data can be stored in a database [67].

After the creation of stateful service/resource [55] the ConfigurationManager invokes [74] the setConfiguration operation on the ConfigurationManagement interface [56] of service [55]. The EndpointReference to ResourceConfiguration stateful web service instance [31] is passed as a parameter. The operating system service [55] can now apply the configuration data stored in ResourceConfiguration stateful web service instance [31] to itself, or to IT resource [68] respectively (i.e. install operating system patches indicated by the "patchLevel" configuration item and created user accounts listed in the "userAccounts" configuration item). To do that, [55] invokes operations on the resource type specific interface [33] of ResourceConfiguration stateful web service instance [31] and retrieves all the resource type specific configuration options. This is indicated by arrow [75] in FIG. 1D. After the ConfigurationManager [24] has created and configured service/resource [55], it continues traversing the graph of ResourceConfiguration stateful web service instances by following stateful web services links between the individual configurations. The ConfigurationManager follows link [40] and finds ResourceConfiguration stateful web service instance [34]. Again, the ConfigurationManager uses the default interface [35] to get to know the type of resource ("application server application" in our example) to which the configuration applies. Next a new stateful service/resource instance [58] "application server" is created on the hosting infrastructure.

ConfigurationManager [24] then invokes setConfiguration on the ConfigurationManagement interface [59] of service [58] and passes the EndpointReference to ResourceConfiguration [34]. Service [58] applies the resource type specific configuration data (that is obtained via the resource type specific interface [36] of ResourceConfiguration stateful web service instance [34]) to itself, or to the "real" IT resource [69] respectively.

In a next step, the ConfigurationManager associates both services/resources [55] and [58] in a "hosts" relationship [64]. The creation of such a relationship might be a simple creation of a logical link using stateful web services relationships, or it might include configuration and installation steps. In the present example, relationship [64] might be created by installing the application server software (represented by service [58]/resource [69]) on the operating system image (service [55]/resource [68]).

The ConfigurationManager now continues to traverse the configuration graph. It finds ResourceConfiguration stateful web service instance [37], creates a new service/resource [61], applies the configuration to the new resources and establishes a relationship [65] between the new resource ("database software" in our example) and the previously created operating system service/resource.

At the end of the process, a new resource structure has been created, that has the same configuration and topology as the original resource structure.

The creation of clone resource structures in accordance to a configuration graph is typically not as straight-forward as outlined in the given example. In a real scenario it is normally necessary to execute installation and configuration steps in a certain sequence (e.g. create resource A before resource B, connect resources A and B, i.e. create a relationship, and then apply configuration data to resources A and B). Finding the right sequence of actions that have to be performed on the hosting infrastructure and on resources is subject to planning algorithms and beyond the scope of this invention.

Deployment Considerations

In the attached figures three individual application servers are shown as hosting environments for the stateful web services encapsulating the resources of the source resource structure, the resources of the clone resource structure and the ResourceConfiguration stateful web service instances. This implies that the source system, the clone system and the system hosting the ResourceConfiguration stateful web service instances can be deployed at different geographical sites. Communication is done using web services calls via a network (possibly the Internet). While this is a valid scenario, it is also possible to have all stateful web services hosted at one site, even in one application server.

The ConfigurationManager is shown as a separate standalone entity with no implication on a hosting environment. One possibility would also be to deploy the ConfigurationManager also as a stateful service in one of the application servers. Furthermore, a deployment option with multiple configuration managers—one at each site—could be chosen, where one ConfigurationManager could be used for taking the configuration snapshot and another one could be used to create the clone resource structure.

With respect to FIGS. 1A-D of the description of the present invention the extensions proposed by the present invention have already been named and explained namely to include (1) two new operations on the service encapsulating a resource and (2) a new stateful service of type ResourceConfiguration.

In the following part of the description additional details on further embodiments of these two inventive extensions are explained.

The interface of the stateful service encapsulating a resource is extended by the two operations getConfiguration and setConfiguration. The first operation allows a caller to retrieve the operational state of a resource. This state is stored in an instance of the ResourceConfiguration stateful web service instance (see below); an EndpointReference to this ResourceConfiguration stateful web service instance is returned by the getConfiguration operation. The second operation, setConfiguration, takes the EndpointReference of a ResourceConfiguration stateful web service instance as input and applies the configuration data stored in this ResourceConfiguration stateful web service instance to the resource encapsulated by the stateful service.

Extending the stateful service by said two operations includes (has to be done be resource developer):
1) extend the service description (WSDL) by two new operations getConfiguration and setConfiguration
2) extend the service endpoint implementation (executable code) by the necessary business methods getConfiguration and setConfiguration. For example, if the service is implemented using an EJB stateless session bean, the bean has to be extended by two public methods with said names.

The "getConfiguration" Operation

The implementation of the "getConfiguration" must execute tasks as outlined below:
  create a new instance of a ResourceConfiguration stateful web service instance for storing configuration data of the encapsulated resource. This is done by invoking the stateless factory operation of the ResourceConfiguration stateful web service instance for that resource (see below). The EndpointReference (EPR) to the new ResourceConfiguration stateful web service instance is returned. The service can now use this EndpointReference (EPR) to store data in the ResourceConfiguration stateful web service instance.
  extract configuration data from the encapsulated resources (via resource manager) and store this configuration data in the new ResourceConfiguration stateful web service instance
  and/or extract configuration data from the state data of the service itself and store it in the new ResourceConfiguration stateful web service instance
  and/or programmatically compile a set of configuration data items and store it in the new ResourceConfiguration stateful web service instance
  return the EPR of the new ResourceConfiguration stateful web service instance (that now contains all relevant configuration data for the resource) to the caller.

The "setConfiguration" Operation

The implementation of the setConfiguration data must execute the tasks outlined below:
  use the EPR that is passed as parameter to this operation to contact the associated ResourceConfiguration stateful web service instance and retrieve all configuration data from that ResourceConfiguration stateful web service instance
  apply each configuration data item to the encapsulated resource execute appropriate commands on the resource manager to configure resource store configuration data on resource via resource manager and/or apply configuration data to itself (i.e. the stateful service encapsulating the resource)—this is for configuration data that results in a change of the stateful service itself and does not require interaction with the encapsulated resource.

The New ResourceConfiguration Stateful Web Service Instance

Another embodiment of the present invention that has to be provided by the resource developer is the implementation artifacts for the ResourceConfiguration stateful web service instance to store configuration data for the respective resource.

These artifacts include:

a service description of the ResourceConfiguration stateful web service instance (WSDL)

a Web Service (WS) endpoint for the ResourceConfiguration stateful web service instance (e.g. WS Router servlet)

the WS endpoint implementation (executable code) for the ResourceConfiguration stateful web service instance.

The endpoint implementation can, for example, be given in the form of EJB stateless session beans, which employ EJB entity beans for storing state data of the ResourceConfiguration stateful web service instance. Note that such implementation is only one of many possibilities to implement stateful web service.

All the artifacts named above are packaged together in an EAR file, which can be deployed onto an application server. On receipt of client requests, the server can then execute the code for the ResourceConfiguration stateful web service instance.

One operation of the ResourceConfiguration stateful web service instance is a stateless factory operation that allows clients to create a new instance of the ResourceConfiguration stateful web service. By means of this factory operation the stateful service encapsulating a resource can thus create a ResourceConfiguration stateful web service instance from within its "getConfiguration" operation (see above) and store its configuration data in the new ResourceConfiguration stateful web service instance.

The EAR file containing the ResourceConfiguration stateful web service instance artifacts can be deployed either on the same application server holding the EAR file that contains the stateful service encapsulating the resource. In that case, the stateful service would talk to the local application server when creating a ResourceConfiguration stateful web service instance. Alternatively, the ResourceConfiguration EAR file could be deployed on a remote application server. The resulting address of the ResourceConfiguration stateful web service instance (i.e. address of remote server in combination with the relative URL of the ResourceConfiguration WS endpoint) then has to be made known to the stateful service encapsulating the resource.

Figure 2A:
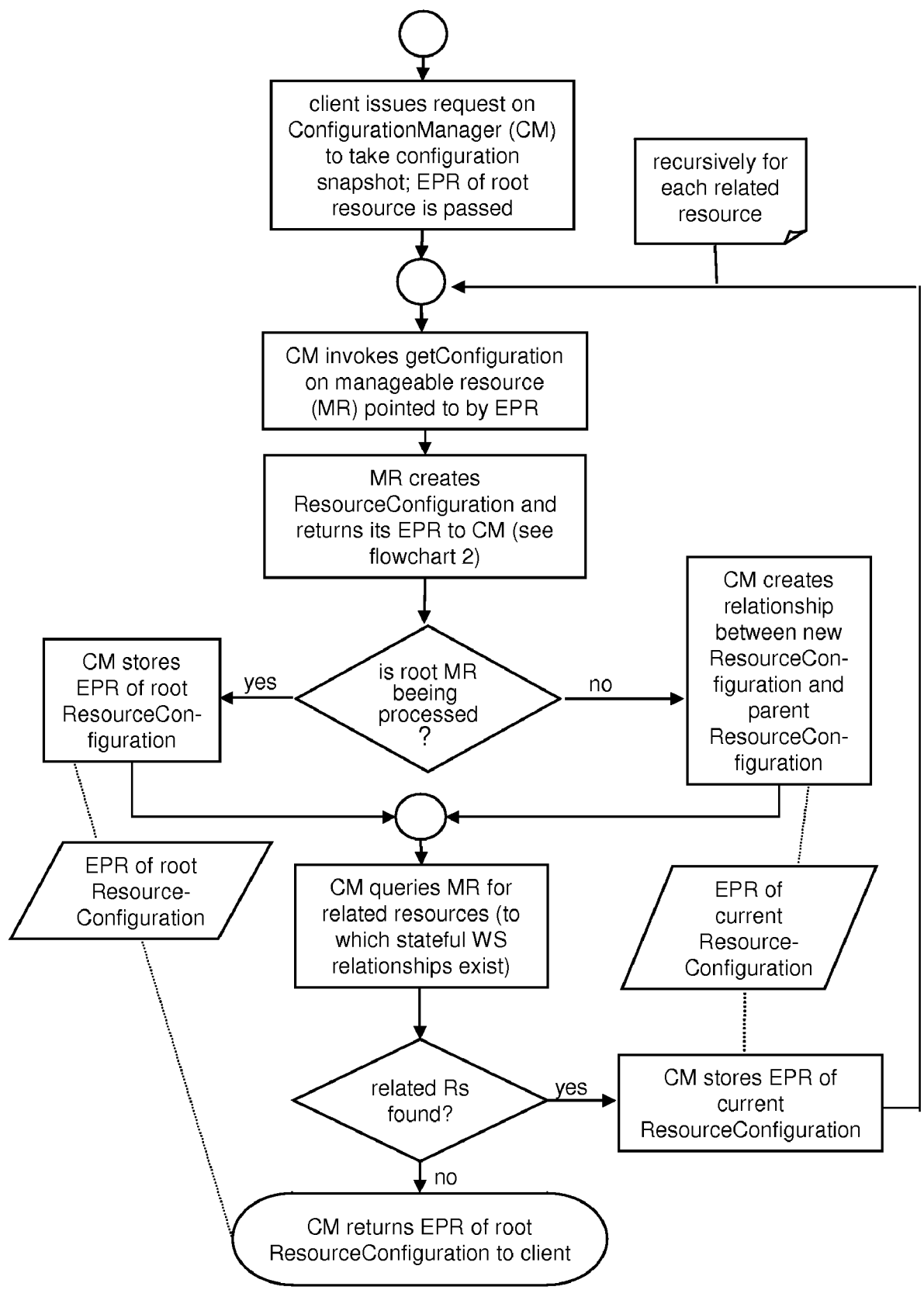
FIG. 2A shows the flow of a preferred embodiment of the present invention for taking configuration snapshot.
Figure 2B:
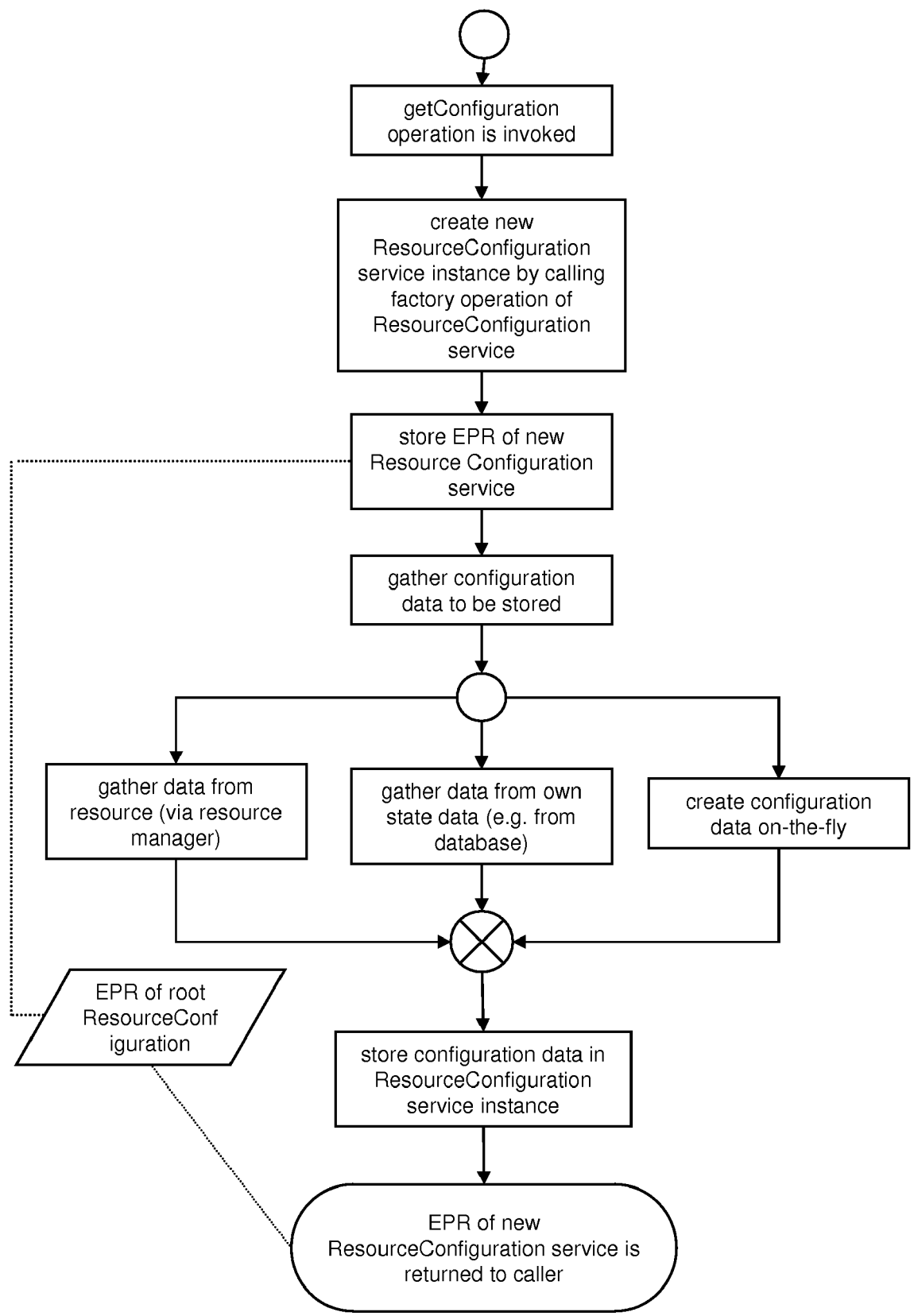
FIG. 2B shows the flow of a preferred embodiment of the present invention of creating a ResourceConfiguration stateful web service instance.
Figure 2C:
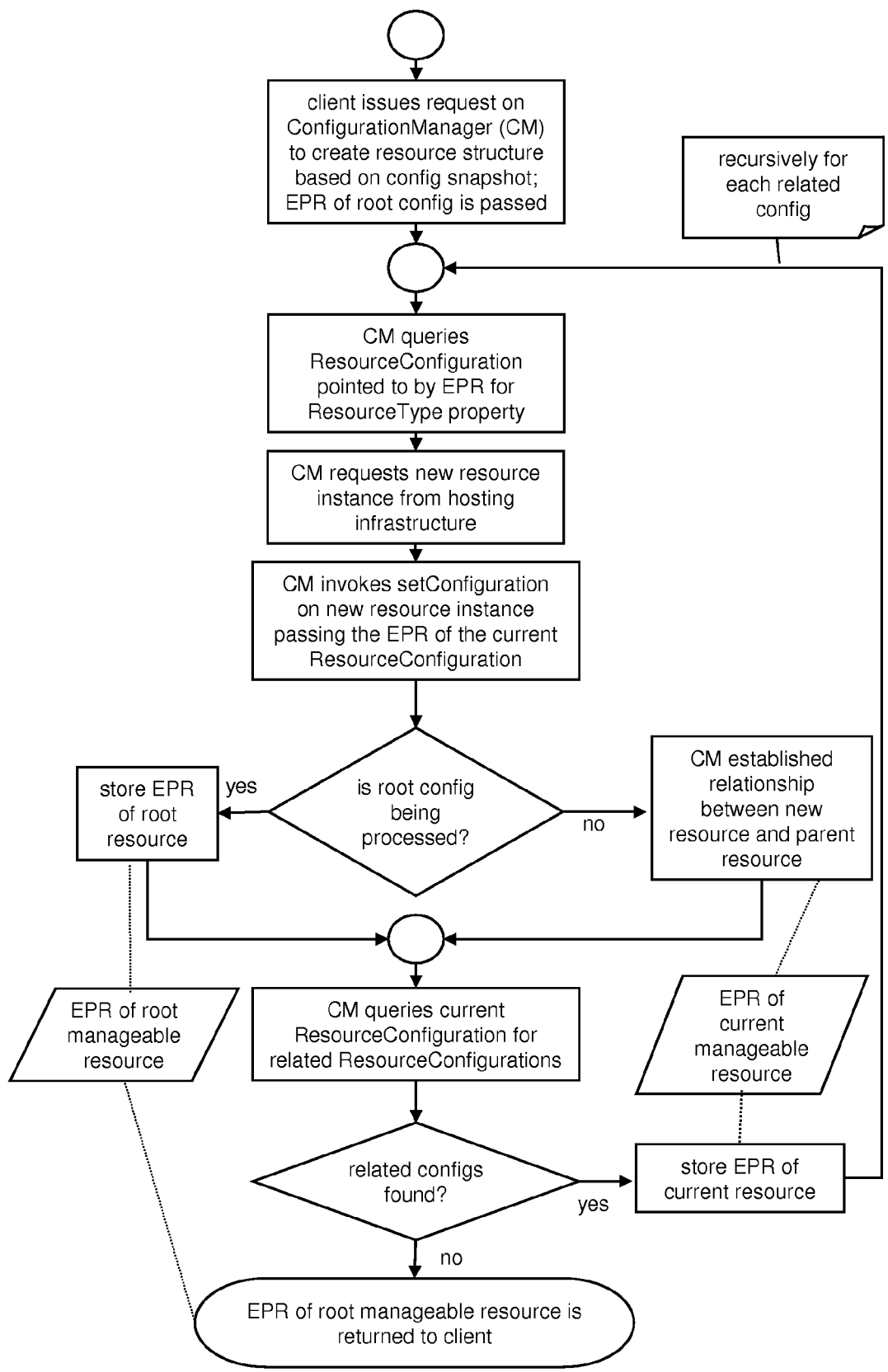
FIG. 2C shows the flow of a preferred embodiment of the present invention of creating an IT resource structure from a configuration graph.

In FIGS. 2A-C a preferred embodiment of the inventive method of cloning a resource structure is explained in more detail.

The inventive method in a preferred embodiment consists of following single process steps:

obtaining the configuration of a resource structure (see FIG. 2A), creating a resource configuration instance (see FIG. 2B), and creating a resource structure from the configuration graph (see FIG. 2C).

Detailed Flow of Obtaining the Configuration of a Resource Structure (See FIG. 2A)

Pre-Conditions:

client has a working IT environment where resources are organized in a resource graph client can access resources via EndpointReferences (EPRs) to the stateful web services encapsulating the resources client has EPR to a root resource, i.e. a resource in the graph from which all other resources can be found by traversing stateful web services relationships client knows address of ConfigurationManager Flow:

client invokes ConfigurationManager (CM) with the request to take a configuration snapshot of the resource graph originating at a specific root resource; the EPR of the root resource is passed as parameter CM invokes "getConfiguration" operation on the root resource resource creates a ResourceConfiguration stateful web service instance that stores all configuration data for the resource since the resource currently being processed is the root resource, the EPR of the created ResourceConfiguration stateful web service instance is temporarily stored and will later be returned to the client (this ResourceConfiguration stateful web service instance will be the root configuration of a graph of configurations that represents the overall configuration of the source resource structure)

CM queries the resource for related resources (these related resources can be found via stateful web service relationships); the set of related resources is returned if related resources are found, the EPR of the current resource's ResourceConfiguration stateful web service instance is temporarily stored, a ResourceConfiguration stateful web service instance is created for each related resource (by invoking the resource's "getConfiguration" operation), a the new ResourceConfiguration stateful web service instances are associated in relationships with the current resource's ResourceConfiguration stateful web service instances; this is repeated recursively over each resource and its related resources if the whole graph of resources has been traversed and a graph of ResourceConfiguration stateful web service instances with the same topology as the resource graph has been created, the EPR of the root ResourceConfiguration stateful web service instance is returned to the client Post-Conditions:

client is now in possession of the EPR to the root ResourceConfiguration stateful web service instance at which the graph of configurations representing the overall system configuration originates Detailed Flow of Creating a ResourceConfiguration Stateful Web Service Instance (See FIG. 2B)

Pre-conditions:

an IT resource is encapsulated by a stateful web service interface clients access resource via the stateful web services interface configuration of resource consists of: configuration data stored on the resource, state data of the stateful web service stateful web service encapsulating the resource knows address of type-specific ResourceConfiguration stateful web service instance for storing resource's configuration data Flow:
"getConfiguration" operation is invoked stateful web service creates a new resource type-specific ResourceConfiguration stateful web service instance by invoking the factory operation of the ResourceConfiguration stateful web service instance EPR to new ResourceConfiguration stateful web service instance is temporarily stored and will later be returned to CM stateful web service encapsulating the resource gathers configuration data for resource
  retrieves configuration data from the resource
  gathers configuration data contained in the stateful web service's state itself
  programmatically compiles some configuration data "on-the-fly", e.g. create some configuration scripts that can later be executed on the target resource the configuration data is stored in the ResourceConfiguration stateful web service instance via web service calls the EPR of the new ResourceConfiguration stateful web service instance is returned to the called Post-Conditions:
a new ResourceConfiguration stateful web service instance has been created which stores the complete configurational state of the resource the caller possesses an EPR to this ResourceConfiguration stateful web service instance Detailed Flow of Creating an it Resource Structure from a Configuration Graph (See FIG. 2C)

Pre-Conditions:
client is in possession of the EPR to the root ResourceConfiguration stateful web service instance at which a graph of configurations representing an overall system configuration originates client knows address of ConfigurationManager for the target hosting infrastructure, i.e. the hosting infrastructure in which the target resource structure shall be created (this ConfigurationManager and infrastructure might be the same as for the source resource structure)

Flow:
client invokes CM with request to create a resource structure according to the configuration data stored in the graph of ResourceConfiguration stateful web service instances; the EPR to the root ResourceConfiguration stateful web service instance is passed as parameter CM retrieves type of resource to which ResourceConfiguration stateful web service instance is associated CM requests a new instance of the appropriate resource type from the hosting infrastructure (for example, hosting infrastructure has free pools for each resource type; the pools contain IT resources which have stateful web services interfaces; outside the scope of this invention)

CM invokes "setConfiguration" on the new resource, passing the EPR of the ResourceConfiguration stateful web service instance currently being processed to the resource configuration data stored in that ResourceConfiguration stateful web service instance is applied to resource since the root ResourceConfiguration stateful web service instance is being processed, the EPR of the corresponding root resource is temporarily stored and will later be returned to the client CM queries the current ResourceConfiguration stateful web service instance for related configurations (these related configurations can be found via stateful web service relationships); the set of related configurations is returned for each related ResourceConfiguration stateful web service instance found a resource of the appropriate type is obtained from the hosting infrastructure, the configuration is applied to that resource, and a relationship between the new resource and the last created (i.e. parent) resource is established; this is repeated recursively over each ResourceConfiguration stateful web service instances and its related configurations if the whole graph of configurations has been traversed and a graph of resources with the same topology as the configuration graph has been created, the EPR of the root resource is returned to the client Post-Conditions:
a resource structure with same topology and configuration as described by the graph of ResourceConfiguration stateful web service instances has been created the EPR of the root resource has been returned to the client the client can now use the new resource structure; resources are accessed via the stateful web services addressed by EPRs; all resources can be found by traversing relationships starting at the root resource.

The invention claimed is:

1. A method for automatically cloning an existing IT resource structure, each resource of said IT resource structure is accessible via a stateful web service, each stateful web service offers resource type specific web services interfaces to query the configurational state of said assigned resource and/or to set up of operations on said assigned resource, each stateful web service additionally provides an interface providing the operations "getConfiguration" and "setConfiguration", said method comprises the steps of:

taking a snapshot of the configurational state of each resource including its relationship to other resources using said "getConfiguration" operation, and storing said configurational state as a separate "ResourceConfiguration stateful web service instance" for each resource;

automatically building a graph by using said snapshots, wherein the nodes in said graph represent instances of said ResourceConfiguration stateful web service, wherein each ResourceConfiguration stateful web service instance provides access to the configuration data for a specific resource and the edges of said graph represent the relationships between said ResourceConfiguration stateful web service instances; and creating a new IT resource structure based on said graph and using said operation "setConfiguration" for applying said configuration state provided by said respective ResourceConfiguration stateful web service instance to said respective resource in said new IT resource structure;

said steps of taking the snapshots and automatically building a graph by using said snapshots comprise the steps of:

traversing said IT resource structure starting at a root resource identified by administrator;

creating a ResourceConfiguration stateful web service instance for said root resource using the operation "getConfiguration";

determining related resources of said root resource and creating a ResourceConfiguration stateful web service instance for each related resource;

associating said related ResourceConfiguration stateful web service instance to said root ResourceConfiguration stateful web service instance in a stateful web service relationship; and recursively repeating said steps for each resource of said IT resource structure.

2. Method according claim 1, wherein said ResourceConfiguration stateful web service instance provides the properties resource type to which the ResourceConfiguration stateful web service instance is assigned, and time stamp which identifies date and time when the ResourceConfiguration stateful web service instance has been created.

3. Method according claim 2, wherein said ResourceConfiguration stateful web service instance further provides resource type specific properties which represents the configurational state of the resource to which said ResourceConfiguration stateful web service instance is assigned to.

4. Method according to claim 1, wherein said step for determining related resources is performed by navigating stateful web service relationships existing between stateful web service encapsulating said resources.

5. Method according to claim 1, wherein said step of creating a new IT resource structure further comprises the steps of:

traversing said graph of ResourceConfiguration stateful web service instance starting at a root ResourceConfiguration stateful web service instance identified by an administrator;

querying said ResourceConfiguration stateful web service instance for type of resource to which it is assigned to; requesting a resource of said type from a resource manager;

applying the configurational state stored in said ResourceConfiguration stateful web service instance to said resource by invoking said operation "setConfiguration";

determining the related ResourceConfiguration stateful web service instances; and requesting a resource for each related ResourceConfiguration stateful web service instance and applying the respective configuration stored in said respective ResourceConfiguration stateful web service instance to said requested resources.

6. Method according to claim 4, wherein said operation "setConfiguration" takes the address of ResourceConfiguration stateful web service instance as an input parameter and reads said configuration state stored in said ResourceConfiguration stateful web service instance and applies it to the respective resource.

7. Method according to claim 1, wherein said stateful web services instances are addressable by EndpointReferences.

8. A system for automatically cloning an existing IT resource structure, each resource of said IT resource structure is accessible via a stateful web service, each stateful web service offers resource type specific web services interfaces to query the configurational state of said assigned resource or to set up of operations on said assigned resource, each stateful web service additionally provides a ConfigurationManagement Interface providing the operations "getConfiguration" and "setConfiguration", said system comprises:

means for taking a snapshot of the configurational state of each resource including its relationship to other resources using said operation "getConfiguration" operation, and means for storing said configurational state as a separate "ResourceConfiguration stateful web service instance" for each resource;

means for automatically building a graph by using said snapshots, wherein the nodes in said graph represent instances of said ResourceConfiguration stateful web service instances, wherein each ResourceConfiguration stateful web service instance provides access to the configuration data for a specific resource and the edges of said graph represent the relationships between said ResourceConfiguration stateful web service instances; and means for creating a new IT resource structure based on said graph and using said operation "setConfiguration" for applying said configuration state provided by said respective ResourceConfiguration stateful web service instance to said respective resource in said new IT resource structure;

said means for taking the snapshots and means for automatically building a graph by using said snapshots comprises:

means for traversing said IT resource structure starting at a root resource identified by administrator;

means for creating a ResourceConfiguration stateful web service instance for said root resource using the operation "getConfiguration";

means for determining related resources of said root resource and creating a ResourceConfiguration stateful web service instance for each related resource;

means for associating said related ResourceConfiguration stateful web service instance instances to said root ResourceConfiguration stateful web service instance in a stateful web service relationship; and means for recursively repeating said steps for each resource of said IT resource structure.

9. System according to claim 8, wherein said ResourceConfiguration stateful web service instance provides the properties resource type to which the ResourceConfiguration stateful web service instance is assigned, and time stamp which identifies date and time when the ResourceConfiguration stateful web service instance has been created.

10. System according claim 9, wherein said ResourceConfiguration stateful web service instance further provides resource type specific properties which represents the configurational state of the resource to which said ResourceConfiguration stateful web service instance is assigned to.

11. System according to claim 8, wherein said means for creating a new IT resource structure comprises:

means for traversing said graph of ResourceConfiguration stateful web service instances starting at a root ResourceConfiguration stateful web service instance identified by an administrator;

means for querying said ResourceConfiguration stateful web service instance for type of resource to which it is assigned to;

means for requesting a resource of said type from a resource manager;

means for applying the configurational state stored in said ResourceConfiguration stateful web service instance to said resource by invoking said operation "setConfiguration";

means for determining the related ResourceConfiguration stateful web service instances; and means for requesting a resource for each related ResourceConfiguration stateful web service instance and applying the respective configuration stored in said respective ResourceConfiguration stateful web service instance to said requested resources.

* * * * *